United States Patent
Mitchell

(10) Patent No.: US 11,526,727 B1
(45) Date of Patent: Dec. 13, 2022

(54) MACHINE LEARNED CHART RECOMMENDATION SYSTEM

(71) Applicant: Rapid7, Inc., Boston, MA (US)

(72) Inventor: Frank Mitchell, Pawtucket, RI (US)

(73) Assignee: Rapid7, Inc., Boston, MA (US)

( * ) Notice: Subject to any disclaimer, the term of this patent is extended or adjusted under 35 U.S.C. 154(b) by 314 days.

(21) Appl. No.: 16/874,579

(22) Filed: May 14, 2020

(51) Int. Cl.
  *G06F 16/00* (2019.01)
  *G06N 3/04* (2006.01)
  *G06F 16/2458* (2019.01)
  *G06F 16/22* (2019.01)
  *G06N 3/08* (2006.01)

(52) U.S. Cl.
  CPC ....... *G06N 3/0427* (2013.01); *G06F 16/2255* (2019.01); *G06F 16/2462* (2019.01); *G06N 3/08* (2013.01)

(58) Field of Classification Search
  None
  See application file for complete search history.

(56) References Cited

U.S. PATENT DOCUMENTS

| | | | |
|---|---|---|---|
| 7,502,780 B2 | 3/2009 | Thorpe | |
| 7,574,036 B2 | 8/2009 | Akahori | |
| 8,775,934 B2 | 7/2014 | Nasle et al. | |
| 8,886,576 B1 | 11/2014 | Sanketi et al. | |
| 9,152,695 B2 | 10/2015 | Tibrewal et al. | |
| 2018/0088753 A1 | 3/2018 | Viegas et al. | |
| 2020/0410729 A1* | 12/2020 | Zhao | G06F 8/34 |
| 2021/0224332 A1* | 7/2021 | Shekhar | G06N 3/08 |

\* cited by examiner

*Primary Examiner* — Anhtai V Tran
(74) *Attorney, Agent, or Firm* — Ashwin Anand

(57) ABSTRACT

Systems and methods are disclosed to implement a chart recommendation system that recommends charts to users during a chart building process. In embodiments, when a new chart is being created, specified features of the chart are provided to a machine learned model such as a self-organizing map. The model will determine a previous chart that is the most similar to the new chart and recommend the previous chart to the user for recreation. In embodiments, newly created charts are added to a library and used to update the model. Charts that are highly popular or authored by expert users may be weighed more heavily during model updates, so that the model will be more influenced by these charts. Advantageously, the disclosed system allows novice users to easily find similar charts created by other users. Additionally, the disclosed system is able to automatically group similar charts without using human-defined classification rules.

20 Claims, 10 Drawing Sheets

```
chart features 400

{
    "chart_name": "Unplanned Reboots",              410
    "chart_type": "line graph",                     412
    "chart_subtype": null,                          414
    "data_source": "alpha-site.event-log",          416
    "query":                                        418
       "select count(reboot) from events
       group by date",
    "time_range":                                   419
       [ "2020-05-01", "2020-05-30" ],
    "creator": {                                    420
       "username": "aesmith",                       422
       "groups": [ "engineering" ],                 424
       "level": "expert-2"                          426
    },
...
    "layout_properties": {                          430
       "report_name": "PCI Report"                  432
       "chart_position": [ 500, 0 ],                434
       "chart_size": [ 250, 500 ],                  436
       "chart_above": "Denied Connections",         438
       "chart_below": null,                         439
...
    "poularity_score": 12                           440
}
```

FIG. 4

MACHINE LEARNED CHART RECOMMENDATION SYSTEM

BACKGROUND

Many data-intensive applications allow users to create chart-based reports. For example, a network security assessment application may allow users to create charts from network data collected from a monitored computer network. Multiple such charts may be used to produce a security compliance report. However, the building of useful data visualizations often requires the user to have substantial domain expertise. In cases where a report includes multiple charts, the domain expertise needed to create the report may be dispersed across many different individuals. While some report creation tools allow users to reuse previous charts created by others, it can still be difficult for novice users to find the most useful charts during the chart creation process. Moreover, current chart libraries are typically organized based on human-defined classification rules. These classification rules may prove to be suboptimal as the library grows and evolves, and changing the rules can be extremely costly. Accordingly, there exists general need for better chart library systems that organize charts in a more automated and flexible manner, and allow novice users to more easily find previous charts.

SUMMARY OF EMBODIMENTS

The systems and methods described herein may be employed in various combinations and in embodiments to implement a chart recommendation system that recommends charts to users using a machine learned model. In some embodiments, when a new chart is being created by a user, specified features of the chart are provided to the machine learned model, which may be a self-organizing map. The machine learned model will determine a previous chart from a chart library that is the most similar to the new chart based on a similarity metric. The recommendation system will then recommend the similar chart to the user for recreation. In some embodiments, newly created charts are added to the library to be used for future recommendations. Charts added to the library may be used to update the machine learned model. In some embodiments, charts that are highly popular or authored by expert users are weighed more heavily during model updates, so that these charts are more influential to the model's future behavior. Advantageously, the disclosed system allows novice users to easily find similar charts created by other users. Moreover, new charts added to the library are automatically grouped with other similar charts based on their characteristics, without using human-defined classification rules.

BRIEF DESCRIPTION OF THE DRAWINGS

FIG. 4 illustrates an example list of chart features that may be used to search for similar charts in a chart recommendation system, according to some embodiments.

Figure 1:
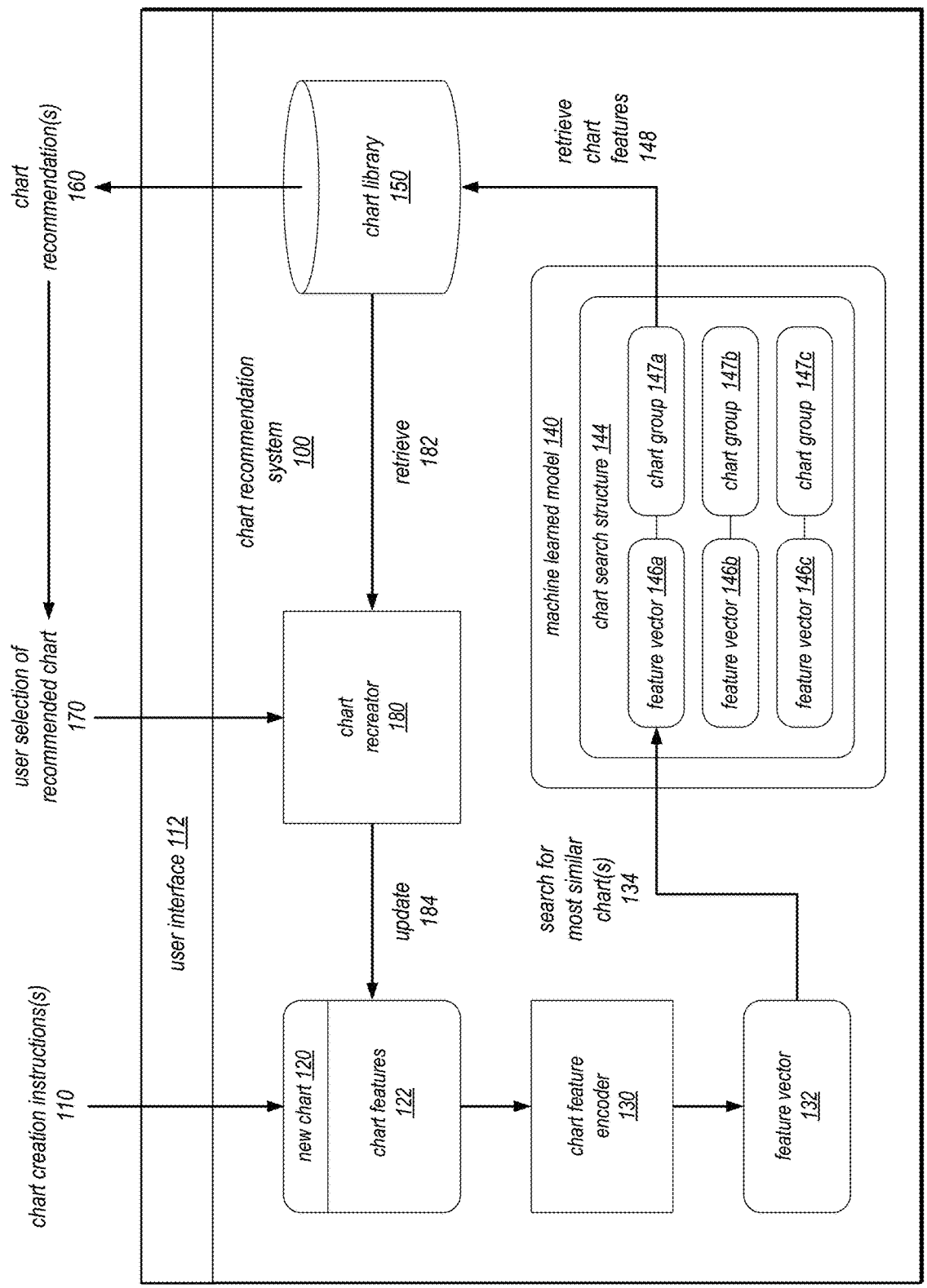
FIG. 1 is a block diagram illustrating a chart recommendation system that uses a machine learned (ML) model to recommend previous charts that are similar to a new chart being constructed, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Many data-intensive applications allow users to create chart-based reports. For example, a network security assessment application may allow users to create charts from collected network data, which may be aggregated to create a security compliance report. However, the building of useful data visualizations often requires the user to have substantial domain expertise. For example, a user may want to create a chart from events recorded in a particular type of firewall log. To do this, the user must possess the required knowledge to query the log using a domain-specific query language, extract the correct data elements in the appropriate time range, and select a chart type and appropriate chart parameters to present the data as a chart. Although a novice user may have a vague idea about some desired properties of the chart, the novice user typically lacks the knowledge needed to fully implement the chart.

Some chart authoring tools may allow users to reuse previous charts created by others users. However, chart repositories typically require some degree of domain knowledge to be searched. As a result, it can be generally difficult for novice users to find the most salient charts for reuse. Additionally, current chart authoring tools do not organize charts in an automatic and flexible way. Manually curated chart libraries are organized based on human-defined classification rules that may prove to be suboptimal as the library grows and evolves. For example, the classification rules may over-classify chart types that are only rarely seen in practice, and under-classify chart types that more common. Changing the classification rules of large libraries may involve retagging hundreds of thousands of existing charts, which can be extremely costly.

To address these and other problems with conventional chart creation and storage systems, this disclosure describes embodiments of a chart recommendation system that is capable of recommending charts, graphs, or other data visualizations to users using a machine learned model. The chart recommendation system may be implemented as part of a chart or report authoring system and configured to generate recommendations during the chart or report creation process. In some embodiments, when a new chart is being created, specified features of the chart are provided to the machine learned model, such as a self-organizing map. The machine learned model is trained to encode an efficient chart search structure that organizes similar charts into groups. The chart recommendation system will use the machine learned model to find charts that are similar to the new chart being created and generate chart recommendations. The chart recommendations are generated automatically based on the properties of the new chart, and does not require the user to have detailed domain knowledge about the chart or the chart creation system.

In some embodiments, newly created charts may be added to a chart library to be used for future chart recommendations. Charts added to the library may also be used to perform periodic updates to the machine learned model. In this manner, the machine learned model can be continuously adapted to the contents of the chart library. This self-management feature of the system removes the need for manual reorganizations of the data. Moreover, the system avoids the use of human-defined classification rules, which reflects undesirable human biases and cannot be easily changed. By using a machine learned model with ongoing retraining, the system is able to adjust the chart search model over time to provide more detailed classification for common chart types. As a result, the system is able to use the model's storage space more optimally.

In some embodiments, certain features of a chart may be used as weights that affect how much the chart influences the machine learned model during model training. For example, one such feature may be a popularity metric that indicates how often a chart has been accepted by a user when it is recommended. As another example, the experience level of the user that created a chart may be used as a weight during model training. By using these weights, charts that are highly popular or authored by expert users will cause the model's structure to be modified more heavily during updates, thereby causing the model learn more from these charts.

As will be appreciated by those skilled in the art, the disclosed features of the chart recommendation system provide numerous technical benefits to improve the functioning of existing chart authoring and library systems in the state of the art. These and other features and benefits of the chart recommendation system are described in further detail below, in connection with the figures.

FIG. 1 is a block diagram illustrating a chart recommendation system that uses a machine learned (ML) model to recommend previous charts that are similar to a new chart being constructed, according to some embodiments.

As shown, the figure depicts a chart recommendation system 100. The chart recommendation system 100 may be implemented as part of a chart or report authoring tool that allows users to create charts or chart-based reports from one or more different data sources. In some embodiments, the chart or report authoring tool may be used to build charts, graphs, or other data visualizations based on operational data captured from computer networks. The charts may be compiled into a security compliance report for a computer network that can be presented via the user interface 112, which may be a dashboard or some other type of graphical user interface.

As shown, a new chart 120 is being created based on chart creation instructions 110 received via the user interface 112. In some embodiments, the user interface 112 may implement a wizard process that takes the user through a series of data entry panels to obtain the user's specified features 122 for the new chart 120. In some embodiments, the instructions 110 may be specified in a configuration file. In some embodiments, the instructions 110 may specified as natural language input from the user, for example, "build a chart of denied connections from firewall logs." In some embodiments, as the chart features 122 are collected from the user, the system may change its chart recommendations in real time based on additional chart features received.

As shown, the chart recommendation system in this example implements a chart feature encoder 130, which is tasked with reducing the chart features 122 into a feature vector 132. Depending on the embodiments, the encoded chart features may include various chart properties such as the name of the chart, a user description of the chart, the name of a report that the chart belongs to, the type of the chart (e.g. a bar chart or a line chart), the data source(s) that the chart data will come from (e.g. one or more log files, databases, data services, etc.), the types of data used in the chart, the query used to retrieve the data for the chart, a time range or time length for of chart, and other types of chart properties. In some embodiments, encoded chart features may also include data about how the chart will be presented in a report, including the chart's layout position in the report, its size dimensions (e.g. its height and width), and the names and properties of other charts in the report that are adjacent or proximal to the chart. In some embodiments, the chart features may also include information about the user who created the chart, such as the user's username, the expertise level of the user, or one or more user groups to which the user belongs.

The chart feature encoder 130 encodes the available chart features 122 into a feature vector 132 suitable for input into the machine learned model 140. In some embodiments, the feature vector is in a pre-defined format (e.g. defined when the model 140 was initially designed) to include a fixed set of encoded features of a chart. In some embodiments, the encoder 130 may normalize individual features in the chart features 112 into a value in a predetermined range of values, and encode the value into the feature vector 132. For example, the encoder 130 may map each individual chart type to a value in a numerical range (0 to N−1) to represent a set of N different chart types. In cases where an expected chart feature in the feature vector is not specified by the input chart features 122, the encoder 130 may add a null value (e.g. −1) into the feature vector for that feature. The null value will cause the machine learned model 140 to ignore that feature when searching for similar charts. In some embodiments where the input chart features 122 are specified in a natural language string, the encoder 130 may be configured to extract the salient words from the string and map those words to the chart features recognized by the model 140. In some embodiments, the encoder 130 may itself be implemented as a machine learned model.

As shown, the feature vector 132 is provided as input to the machine learned model 140, in order to perform a search 134 for previous chart(s) that are the most similar to the new chart 120 being created. The machine learned model 140 may be previously trained using a machine learning process to perform the search efficiently using a chart search structure 144, which may be encoded as a part of the model. As shown in this example, the chart search structure 144 maps distinct feature vectors 146a-c to different chart groups 147a-c. In some embodiments, the charts in the chart groups 147 may be previous charts that were used to train the model 140. In some embodiments, the previous charts may be saved in a chart library 150. Each chart group 147 includes a set of one or more similar charts that are group according to a similarity metric. Two charts' similarity may be quantified using a metric such as the Euclidean distance between their respective feature vectors. To perform the search 134, the machine learned model 140 will find the feature vector 146 that is the closest (or most similar) to the input feature vector 132.

In some embodiments, the machine learned model 140 may be a self-organizing map (SOM). In a SOM model, an artificial neural network is trained using an unsupervised learning process to create a two-dimensional representation of a set of training samples (here the feature vectors of the charts). The artificial neural network is organized in a regular grid where each neuron or unit is connected to an equal number (e.g. four or six) of neighboring neurons on units. In some embodiments, a toroidal grid may be used where units on opposite edges of the grid are connected, so that no edges exist in the network. Each unit in the neural network is associated with a weight vector that will be tuned during model training.

When the SOM model is trained, a large number of input feature vectors are used to adjust the weight vectors of the model units. For each input feature vector, a best matching unit (BMU) in the neural network is determined based on the similarity metric (e.g. Euclidean distance) computed between the feature vector and the weight vectors of the units. Then, the weights of the BMU and a set of units near the BMU are adjusted towards the input feature vector. The amount of the adjustment decreases as grid distance increases from the BMU. Thus, each input feature vector during training will distort the shape of the network in the feature vector space, but preserve the topological relationship of the units based on two-dimensional grid. After many training samples, the weight vectors of the units in the SOM will be grouped around clusters of input feature vectors that are similar. Thus, the units of the neural network "self-organize" into groups, so that the network devotes more units to distinguish dense clusters of similar samples observed during training, and fewer units to parts of the search space where few or no training samples were observed.

Where the machine learned model 140 is a SOM model, the feature vectors 146 are the weight vectors of the units in the SOM model, and the chart groups 147 are sets of one or more charts that are assigned to individual units in the SOM. In some embodiments, multiple previous charts in the chart library 150 may be mapped to the same unit in the SOM, and these multiple charts will belong to the same chart group 147. In some embodiments, the previous charts saved in the chart library 150 may include the training samples that were used to train the model 140.

In one embodiment, a 20×20 toroidal map of 400 units arranged in a grid of squares were used to implement the SOM model. The SOM was trained over 100 iterations of batched training samples, with a learning rate of 0.1. The resulting SOM was then used to classify a substantial library of charts for recommendation with excellent results.

It is noted that the self-organizing map is only one example type of machine learned model that can be used by the chart recommendation system 100. Depending on the embodiment, other types of machine learned models may also be used. For example, in some embodiments, a different type of neural network may be trained to create a different type of chart search structure 144. As another example, a clustering model such as a K-means model may be used to learn a specified number of clusters of chart feature vectors. In the K-means example, the feature vectors 146 may be the representative vectors for each cluster (e.g. the centroid vector computed from the member charts in that cluster), and each chart group 147 will contain charts that belong a cluster.

As shown, once the most similar chart group 147a is determined by the model 140, the model's output is used to retrieve 148 the features of charts in that chart group. As shown, the chart features are retrieved 148 from the chart library 150. In some embodiments, the chart library 150 may be implemented as a lookup data structure such as a hash table that stores the saved features of the charts. In some embodiments, the chart library 150 may be implemented as a more sophisticated data store, such as a persistent database. As one example, the database may implement a key-value store, and the model 140 may output chart group identifiers that can be used as keys to look up saved charts in the library. In some embodiments, the chart library may store a variety of data and metadata about the charts, including the charts themselves in a compiled form (e.g. as binary objects) that can be used to easily recreated the charts. As shown in this example, the retrieved features are provided as chart recommendations 160 to the user via the user interface 112. In some embodiments, the recommendations may indicate a graphical preview of the charts. The recommendations may be updated in real time as the user specifies different chart features 122 for the new chart 120 during the chart building process.

As shown, at some point, the user may select 170 one of the recommended charts via the user interface 112 in order to recreate the recommended chart. Once the selection is made, a chart recreator component 180 will retrieve 182 the selected chart from the chart library 150, and recreate the previous chart by updating 184 the features 122 of new chart 120 under construction. In some embodiments, the system may simply discard the new chart 120, and recreate the selected previous chart in its place. In some embodiments, the system will display the recreated chart via the user interface 112. The user may then continue to make further modifications to the recreated chart to suit his or her own needs. As the user makes these modifications, the system may continue to generate additional chart recommendations based on further changes to the chart features.

Figure 2:
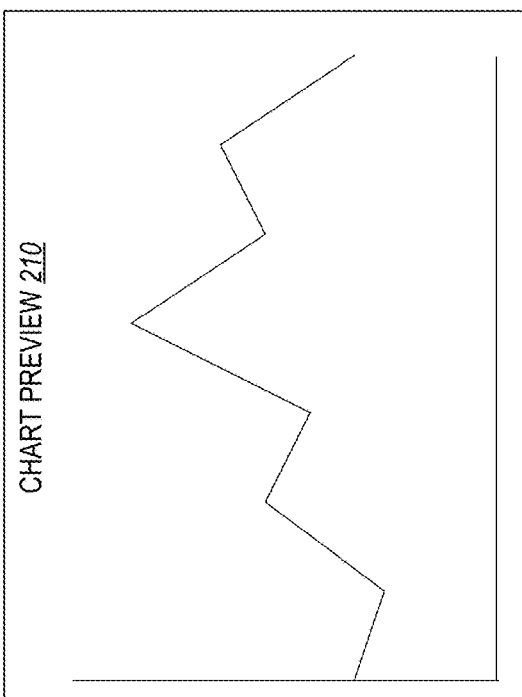
FIG. 2 depicts an example graphical user interface (GUI) that displays charts recommended by a ML model during a chart creation process, according to some embodiments.

FIG. 2 depicts an example graphical user interface (GUI) that displays charts recommended by a ML model during a chart creation process, according to some embodiments. The depicted GUI 200 may be implemented as part of the user interface 112 of FIG. 1.

As shown, GUI 200 is a user window or dialog for creating new charts. In some embodiments, the GUI may be implemented as a web-based interface that is generated by a web server and displayed by a client web browser. In this example, the GUI includes a chart preview area 210 for previewing a new chart under construction. The GUI also includes a chart properties section 220 that allows a user to specify various properties of the chart (e.g. the chart name, the data source used, the chart's dimensions in a report, etc.). In some embodiments, some properties of the chart (e.g. the chart creator) may be auto-populated by the GUI. In some embodiments, the chart preview 210 may be automatically updated as new chart properties are specified in the properties section 220. As will be appreciated by those skilled in the art, the precise look and feel of the GUI 200 will vary depending on the embodiment. As discussed, in some embodiments, the chart creation process may implement a wizard process using a sequence of user panels, or be driven by natural language input that specifies a chart description. In some embodiments, the chart creation interface may be part of a report building interface that allows users to build multi-chart reports.

As shown, the GUI 200 also provides a chart recommendation section 230 that displays chart recommendations based on the properties of the chart being constructed. These recommendations may be generated by the ML model 140 of FIG. 1. In this example, two chart recommendations are provided by the system. In some embodiments, the chart recommendation system may select not just a single closest chart to the chart being constructed, but multiple similar charts. The number of charts recommendations may be configurable based on one or more user-specified criteria, such as a threshold for the similarity metric, a maximum number of recommendations, or other types of search filtering criteria. In some embodiments, the recommendations may be displayed in a sort order based on one or more ranking factors (e.g. the chart's popularity score, similarity metric, date of creation, etc.).

As shown in this example, the GUI 200 allows the recommended charts to be viewed by clicking on the view link. In some embodiments, clicking on the view link may cause the GUI to display a previously captured snapshot of the chart. In some embodiments, the view link may actually cause the system to recreate the chart from live data. The recreate link in this example may be used to copy the features of the recommended chart to the new chart, or recreate the recommended chart as the new chart. The recreation process may be performed by the system as discussed in connection with the chart recreator component 180 of FIG. 1.

As shown, the GUI in this example also displays a popularity metric of the recommended charts. Depending on the embodiment, the popularity metric may indicate different type of metadata about a chart, such as the number of times that a chart was recommended, the number of times that a chart was recreated by other users, or a user rating of the chart. The popularity metric is shown to the user in this example as part of the recommendation information. In some embodiments, the popularity metric may be used to perform further retraining of the machine learned model 140, so that the model will learn to focus more on charts that are more popular with other users.

Figure 3A:
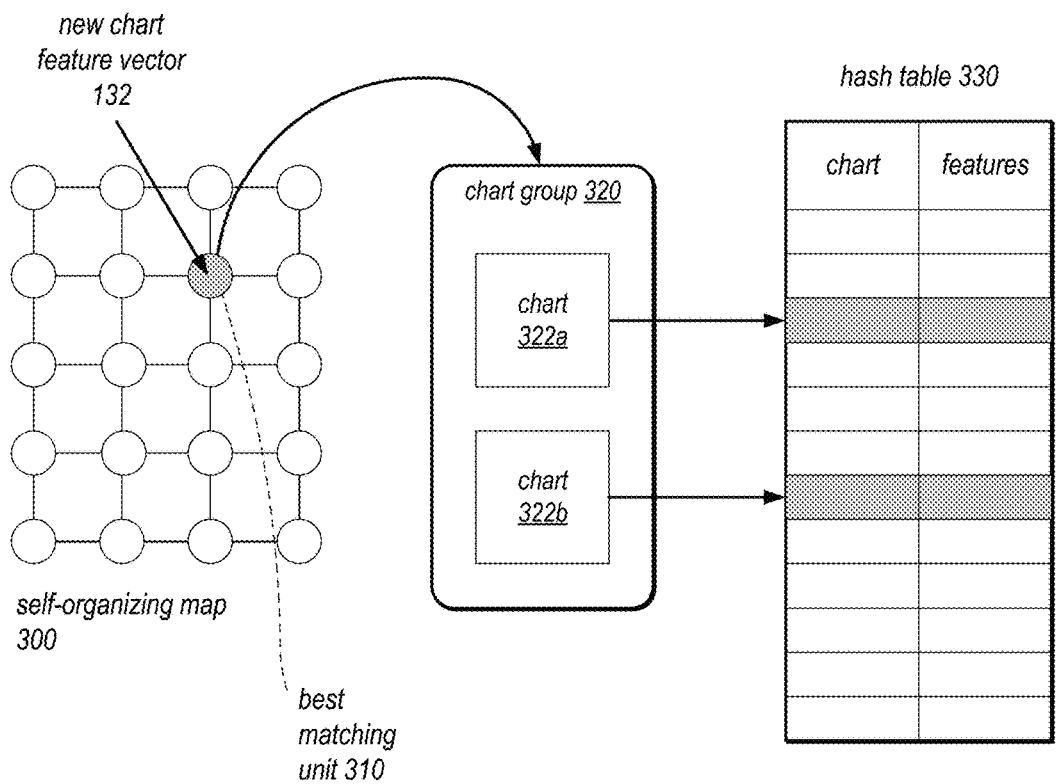
FIG. 3A illustrates the use of a self-organizing map (SOM) to implement a chart recommendation model for recommending charts, according to some embodiments.

FIG. 3A illustrates the use of a self-organizing map (SOM) to implement a chart recommendation model for recommending charts, according to some embodiments. The self-organizing map 300 shown in the figure is an embodiment of the machine learned model 140 of FIG. 1.

FIG. 3A depicts a search or lookup process that is performed when making chart recommendations, as discussed in connection with FIG. 1. As shown, the feature vector 132 representing a new chart is received as input to a SOM model 300. In this example, the SOM model is organized in a rectangular grid of neurons or units, where each unit has four direct neighbors. In some embodiments, each unit of the SOM 300 is connected to a different number of neighbors (e.g. three or six neighbors). In some embodiments, instead of a two-dimensional arrangement, the SOM may be arranged as a three-dimensional network.

In some embodiments, the SOM 300 will compare the input feature vector 132 and determining a "winning" unit (or best matching unit 310) in the network that is the closest to the input feature vector in terms of a similarity metric (e.g. the Euclidean distance between the input feature vector and the weight vector of the unit). In some embodiments, BMU 310 may be the unit that outputs the strongest activation value, which may be selected by a softmax layer. Accordingly, the SOM classifies the input feature vector into one of a number of chart groups.

Chart group 320 is an embodiment of the chart groups 147 discussed in connection with FIG. 1. As discussed, in the context of SOMs, each chart group 320 is a group of similar charts that is mapped to a unit in the neural network. In this example, two charts 322a and 322b are mapped to the BMU 310. The two charts 322a and 322b may not be identical. However, they are sufficiently similar based on their features so that they are mapped to the same best matching unit 310. In some embodiments, the two charts in the chart group 320 will be presented as the results of the similar chart search.

As shown in this example, the two charts determined by the search are used to retrieve their chart features in a hash table 330. The hash table 330 is an embodiment of the chart library 150 discussed in connection with FIG. 1. In other embodiments, other types of data structures or storage systems may be used to implement the chart library. In some embodiments, the output of the SOM 300 will indicate the unit identifier of the BMU 310. The unit identifier is then used (e.g. hashed according to a hash function) to identify chart data of the two charts from the chart library. In some embodiments, the chart library will store all features of stored charts so that the charts can be recreated.

Figure 3B:
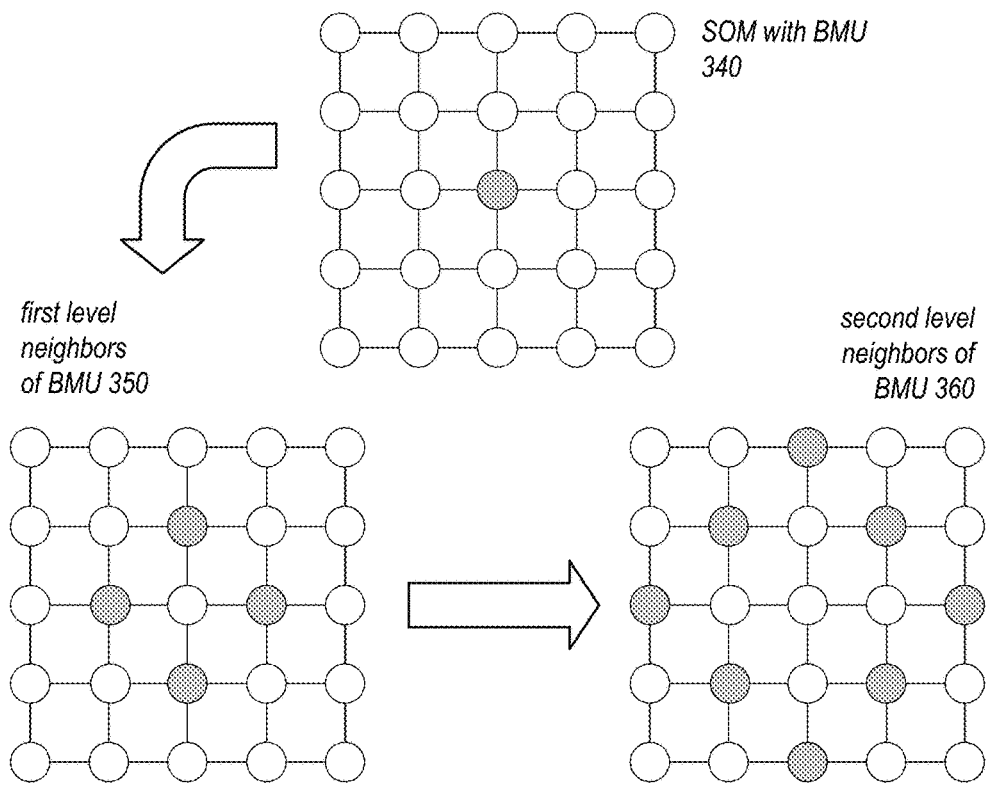
FIG. 3B illustrates an example chart search process performed using a trained SOM model, according to some embodiments.

FIG. 3B illustrates an example chart search process performed using a trained SOM model, according to some embodiments. The depicted process may be performed as part of the chart searching process 134 discussed in connection with FIG. 1.

FIG. 3B depicts three iterations of a search for similar charts using a SOM 340 that successively expands the neighborhood scope of the search from an initial BMU. This expansion of the search may be performed in situations where no charts are mapped to the initial BMU. Alternatively, in some embodiments, the chart recommendation system may be configured to return a minimum number of similar charts, and the initial BMU may not be associated with a sufficient number of similar charts.

During an expanding search for charts, the search process visits the neighboring units of the BMU in successively expanding neighborhood levels. As shown, at iteration 350, units in a first level of neighboring units are visited (e.g. the four units that are within one connection hop from the BMU). If a sufficient number of similar charts are found in this first level of neighboring units, the search process will be stopped. If not, a second iteration 360 of searching is performed, where a second level of neighboring units are visited (e.g. the eight units that are two connection hops from the BMU). This expanding search process will continue until a sufficient number of similar charts are found.

As may be appreciated by those skilled in the art, other variations on this search process are possible. In some embodiments, the search process may be stopped after the Euclidean distance between additional units and the original BMU exceeds a specified limit. In some embodiments, the neighboring units in each neighborhood level may be visited in an order determined based on their distances from the BMU.

FIG. 4 illustrates an example list of chart features that may be used to search for similar charts in a chart recommendation system, according to some embodiments. The features 400 shown in the figure are examples of the chart features 122 of FIG. 1, and may be encoded as part of the feature vector 132 of FIG. 1.

As shown in this example, the chart features 400 are feature of a single chart. The chart name 410 of the chart ("Unplanned Reboots") is included as a feature, because it often provides a brief description of the chart. The features also include a chart type 412 and chart subtype 414 of the chart. In some embodiments, the chart type and subtype may be encoded together as a single feature. As shown, the chart subtype feature in this example is unspecified. In some embodiments, unspecified chart features may be encoded using a null value in the feature vector (e.g. −1), and the machine learned model will be configured to ignore these unspecified features during the chart search.

As shown, another chart feature that may be encoded in the feature vector is the name of the data source 416 from which the chart data is retrieved. Data sources may be log files, databases, or other types of data generating services or systems. In this example, the data source 416 is an event log file, which may be produced by a network monitoring system.

As shown, another chart feature in this example is the query 418 used to extract the data used in the chart. In some embodiments, the query may be specified using a set of filtering parameters, or a query language such as Structured Query Language or SQL. The query may be formatted differently based on the data source. Another chart feature used in this example is the time range 419 of the chart. The time range may or may not be specified depending on the type of the chart.

As shown, the chart features may also include attributes of the chart's creator 420. The creator attributes may include the creator's username 422, user groups 424, and the user's expertise level 426. In some embodiments, these attributes of the creator user will be used in the determination of similar charts, so that, for example, charts created by users from the same group will be considered more similar than charts created by users from different groups. In some embodiments, the expertise level 426 of the creator may be taken into account when the model is updated during model training. For example, charts created by a user with high expertise may be given more weight, so that they will cause more structural changes in the model.

As shown in this example, the chart features also include a number of layout properties 430 of the chart, which describe to how the chart will be positioned and presented in a layout group (e.g. a multi-chart report). In this example, the encoded layout properties include the name of the chart report 432, the chart's position 434 within the report, the chart's size 436 in the report (e.g. its height and width), and the names of neighboring charts in the report that are above 438 or below 439 the chart. In some embodiments, some of the layout features will be provided as part of the chart recommended by the chart recommendation system, so that the recommendation will indicate the position and/or size of the chart in the layout group.

Finally, in this example, the chart features also include a popularity score 440 associated with the chart. In some embodiments, this popularity score or metric cannot be modified by the creator of the chart. Rather, it may be updated whenever the chart is viewed or reused by another user. The popularity score indicates how useful a given chart is to other users, and more popular charts may be given more weight when they are used to perform additional training of the machine learned model.

Figure 5:
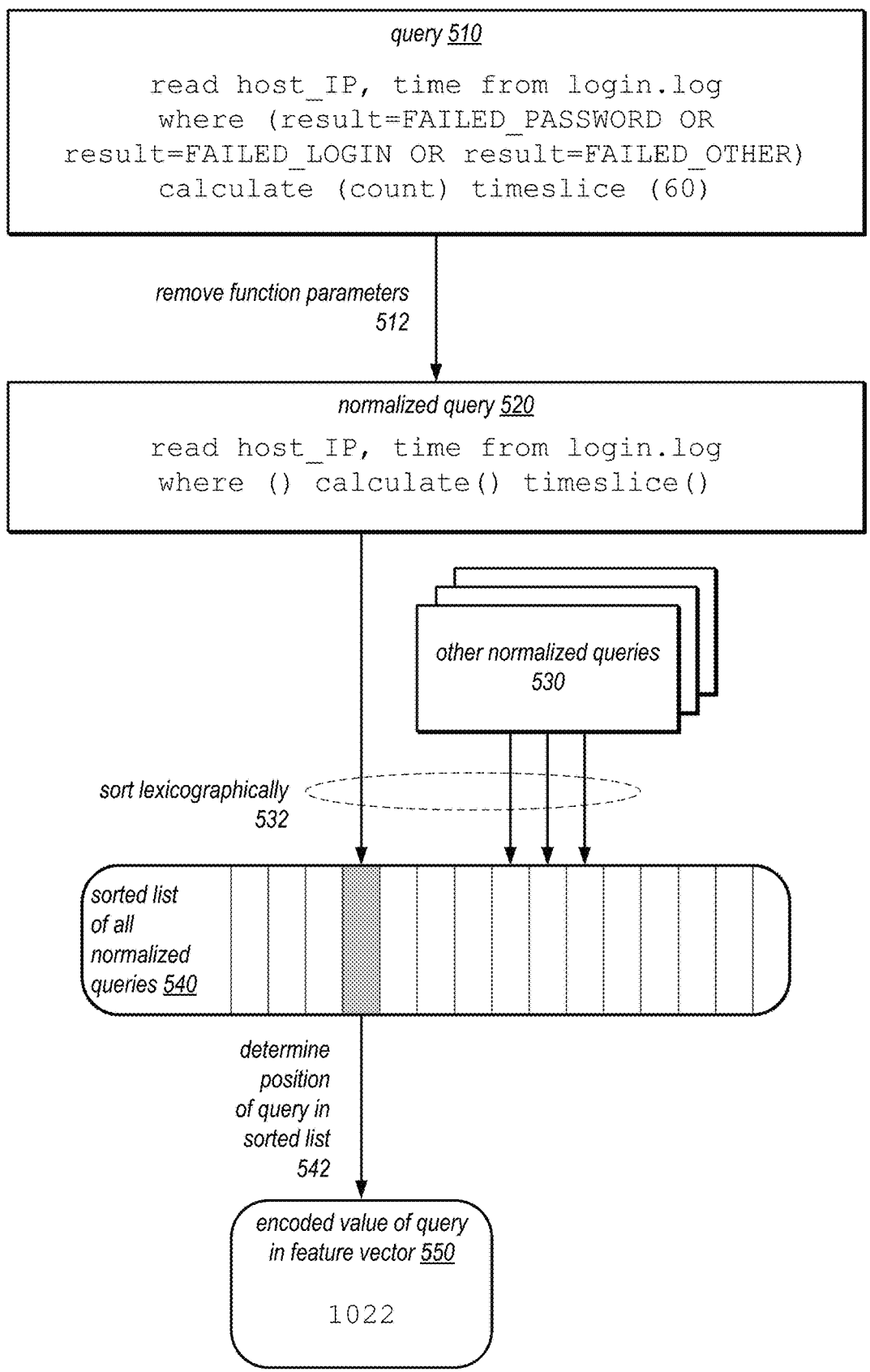
FIG. 5 illustrates an example encoding process that encodes a query used by a chart to generate a feature vector of the chart, according to some embodiments.

FIG. 5 illustrates an example encoding process that encodes a query used by a chart to generate a feature vector of the chart, according to some embodiments. In some embodiments, the encoding process may be performed by the chart feature encoder 130 of FIG. 1.

As shown in the figure, a query 510 is received by the encoder, which converts the query into an encoded value in the feature vector of the chart (e.g. feature vector 132 of FIG. 1). The encoder may perform one or more transformations on each feature of the chart, and then combine the encoded values to generate the feature vector. In some embodiments, the manner in which the feature vector is constructed may be configurable via a configuration interface of the system. Such a configuration interface may allow users to specify which features are to be included in the feature vector, and the different transformations that are to be applied to the features to generate respective encoded values. In some embodiments, these types of feature engineering decisions are made when the machine learned model is initially designed.

As shown, the query in this example invokes a number of functions: a "where" function that specifies certain conditional filters, a calculate function that specifies a statistic to be computed, and a time slice function that specifies the time granularity for the calculate function. In some embodiments, the input parameters to these functions may be less important when comparing charts. Two charts having slightly different function input parameters may still be considered similar for recommendation purposes. Thus, some embodiments of the encoder may be configured to remove 512 these function parameters so that they are not included in the feature vector. This removal step produces a normalized query 520, as shown.

Depending on the embodiment, other types of chart features may also be normalized to remove details that are unimportant to chart comparison. In some embodiments, particular components of names or identifiers may be removed during a normalization step. For example, in the chart features of FIG. 4, the beginning portion of the data source name "alpha-site" may be removed. As another example, certain vendor-specific identifiers may be removed from data source names or other chart features.

As shown, after the query is normalized, it is added to a set of other normalized queries 530 and then sorted lexicographically 532 to produce a sorted list of normalized queries 540. The sorted list assigns a unique list position to each distinct normalized query. Thus, if there are N distinct normalized queries, each may be assigned a unique value (0 to N−1) based on the query's position in the list. This unique value will be used as the encoded value of the query in the feature vector. Note that the sort operation only needs to be performed once during the initial creation of the machine learned model, in order to determine the feature space of the queries. After the sorted list 540 is created, it will remain fixed for subsequent encodings of new charts.

The encoded values of other chart features may be determined in a similar manner. For example, data source names or report names may be sorted lexicographically to obtain a unique value for each distinct name. Numeric feature values may be sorted to determine the maximum value for the feature in the training samples. The feature space for the numeric feature will span a range from zero to the maximum. In some embodiments, each distinct chart type may be assigned a unique encoded value in the feature vector. In other embodiments, a different method of assigning encoded values to feature values may be used. For example, a hash function may be used to hash distinct feature values into values in a feature space. However, the sorted list method guarantees the smallest possible feature space and a compact feature vector.

In some embodiments, chart features that include queries, descriptions, and other types of natural language data may be encoded into a semantic embedding where semantically related words or phrases are mapped to similar semantic embeddings. In some embodiments, the semantic embeddings may be generated using another machine learned model (e.g. a word2vec neural network). In this manner, the encoded values of two semantically related feature values may be assigned closer positions in the feature space, and two feature vectors encoding semantically related values will be separated by a shorter Euclidean distance.

As shown, after the sorted list 540 is created, the encoded value of the query 550 is obtained by simply determining 542 the position of the query in the sorted list. This encoded value 550 will be used to represent the query in the feature vector produced by the encoder. In some embodiments, if the input query does not match any of the known queries in the sorted list 540, a null value will be generated for the query in the feature vector.

Figure 6:
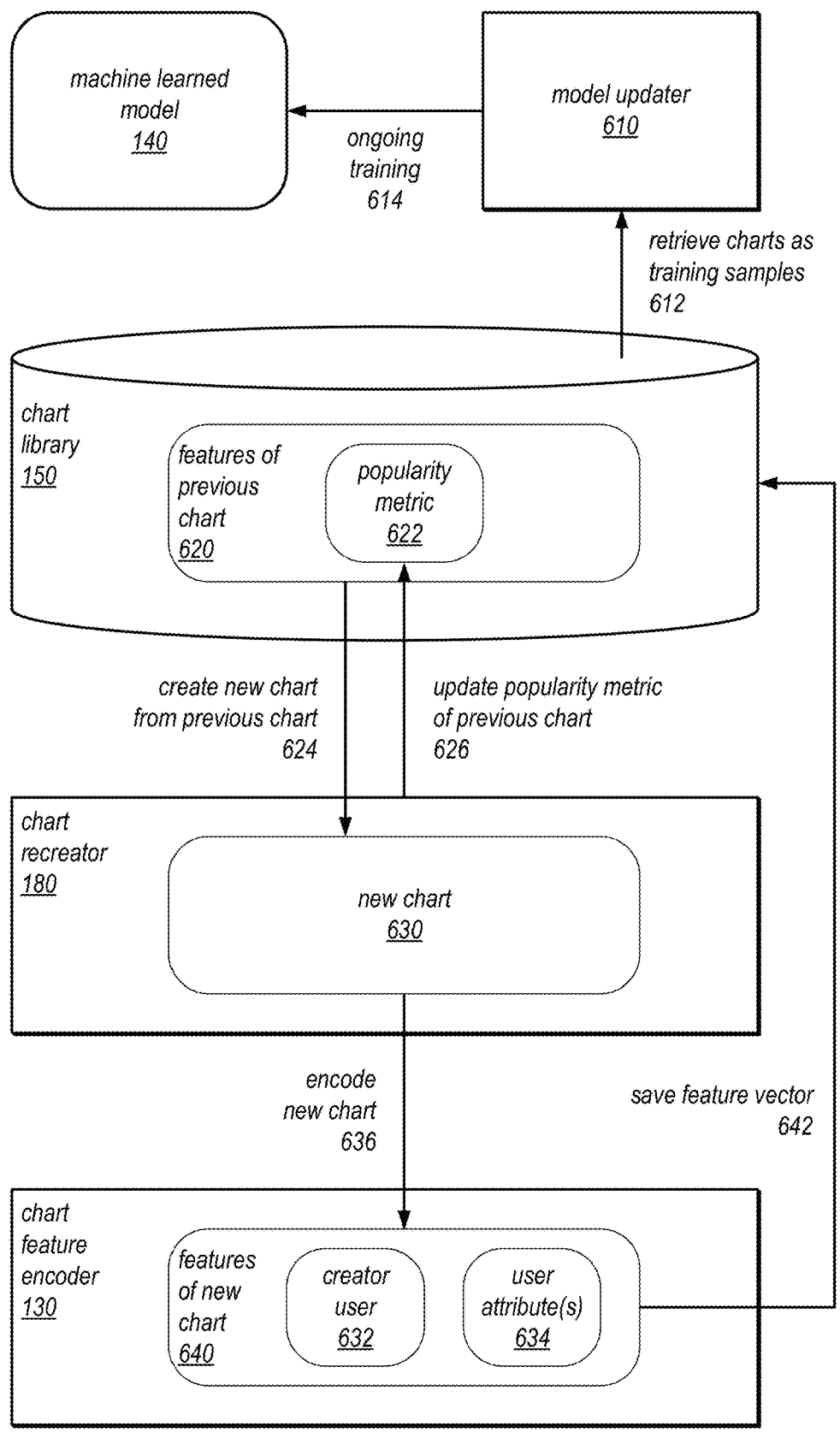
FIG. 6 illustrates an ongoing retraining of a chart recommendation model, according to some embodiments.

FIG. 6 illustrates an ongoing retraining of a chart recommendation model, according to some embodiments.

In some embodiments, after the machine learned model 140 is initially trained, it may go through ongoing further training 614, using a model updater component 610. In some embodiments, the depicted model updater component 610 may be implemented as a part of chart recommendation system 100 of FIG. 1. In other embodiments, the model updater 610 may be implemented separately from the chart recommendation system.

The ongoing training 614 of the model may be performed in a variety of different ways, which may be configurable through a configuration interface of the system. In some embodiments, the training 614 may be performed as each new chart is created by the system and added to the chart library. In some embodiments, the training may be performed periodically for batches of new charts. The batches may be periodically retrieved 612 from the chart library as training samples for the model. In some embodiments, the chart recommendation system may ask the user if a newly created chart should be added to the chart library 150. If so, the new chart will be used as a training sample during a next training session of the model. In some embodiments, the training may be performed according to a set schedule (e.g. once a week), to readjust the chart search structure based on the changing contents of the chart library.

The figure shows that a set of features 620 of a previous chart are stored in the chart library 150. At some point, a new chart 630 is recreated from the previous chart. The recreation process 624 may be performed by the chart recreator component 180, as discussed in connection with FIG. 1. As shown, the recreation of the new chart causes a popularity metric 622 of the previous chart to be updated 626 in the chart library. In some embodiments, the popularity metric 622 may reflect how popular a saved chart is to other users (e.g., based on the number of times that it has been recreated). As a result, the next time the machine learned model 140 is trained, the updated popularity metric 622 for the previous chart will be taken into account, causing the model to focus more on that particular chart. For example, in a SOM model, the weights of neurons close to the chart's features will be adjusted more aggressively toward the features. In this manner, the structure of the model will evolve over time to group more neurons (and chart comparison capabilities) around popular charts that are heavily reused. As a result, the recommendation system will be able to make more discriminating choices when making recommendations from that part of the search space.

The figure also shows the encoded features 640 of the new chart, which is encoded 636 by the chart feature encoder 130. The encoding may be performed in a manner similar to the encoding process discussed in connection with FIGS. 1 and 5. The encoded features 640 may be the feature vector 132 of FIG. 1. As shown in this example, the features 640 include an identification of the user 632 who created the new chart and user attribute(s) 634 of the user. In some embodiments, such information about the chart's creator are included as part of the chart's features, and saved 642 in the chart library 150. In some embodiments, the identity of the creator user 632 may be used when determining the similarity of charts, so that charts created by the same user are deemed to be more similar and more likely to be recommended. In some embodiments, a user group of the creator user may be used to determine chart similarity. In some embodiments, an expertise level of the creator may also be saved as a chart feature. The expertise level of the creator may be used to influence how much the new chart will influence the model during model training, similar to the popularity metric 622. For example, a chart created by a user with a high expertise level will cause the model to adjust its structure more heavily towards that chart. Accordingly, the model will learn to focus more on charts created by experts over time.

Figure 7:
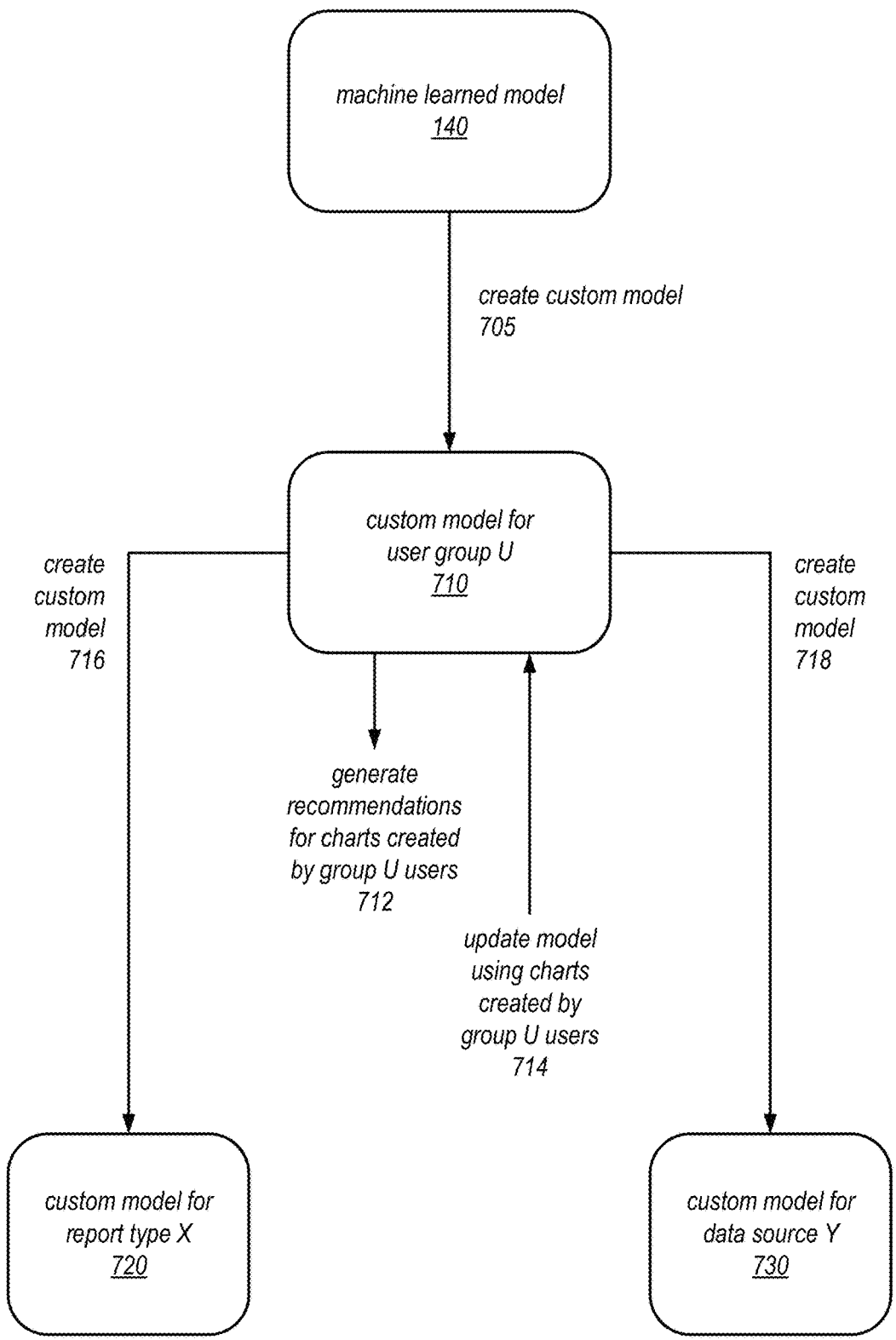
FIG. 7 illustrates multiple custom chart recommendation models that are created from a parent chart recommendation model, according to some embodiments.

FIG. 7 illustrates multiple custom chart recommendation models that are created from a parent chart recommendation model, according to some embodiments.

In some embodiments, the chart recommendation system may allow users to create 705 custom chart recommendation models from a parent model (e.g. model 140 of FIG. 1). Custom models may be created for different categories of charts, or for individual users, groups, reports, projects, or libraries. For example, a group U of users may wish to create a private chart library for the group, but start with an existing public library as a source of chart recommendations. In some embodiments, the chart recommendation system may be used to create a custom chart recommendation model 710 for the private chart library.

The custom model 710 may initially copy the structure of its parent model 140. Once the custom model is created, the custom model will be used to generate 712 chart recommendations for new charts created by users from that user group. Moreover, the custom model will be updated 714 by charts created by users in the user group through ongoing retraining. However, the charts created by group U users will not be used to retrain or update the parent model 140. As a result, custom model 710 will change over time to tailor its chart recommendations to charts created by user group U.

As shown, the custom model 710 may be used as the basis to create additional custom models. In this example, the custom model 710 is used to create 716 a second custom model 720 for a particular type of report. The custom model is also used to create 718 a third custom model 730 for charts that pull data from a particular data source. In the described manner, the chart recommendation system will allow users to create a large number of custom models from existing models, where each custom model is used by the system to make recommendations for a specific subcategory of charts in the scope of its parent model. The scope of the custom model may be defined based on one or more features of the charts.

Figure 8:
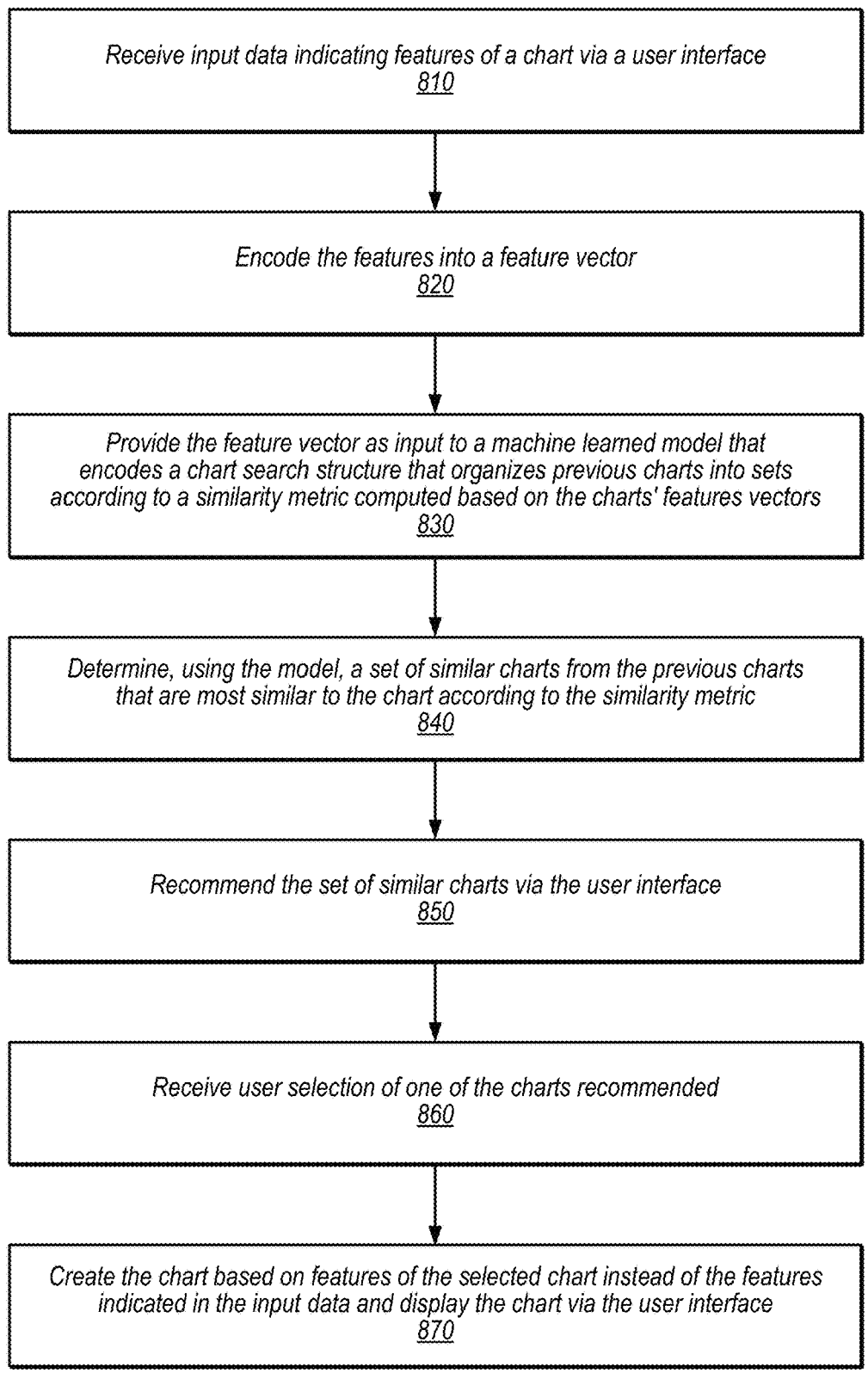
FIG. 8 is a flowchart illustrating a chart creation process where previous charts are recommended by a chart recommendation model during the creation of a new chart, according to some embodiments.

FIG. 8 is a flowchart illustrating a chart creation process where previous charts are recommended by a chart recommendation model during the creation of a new chart, according to some embodiments. The depicted process may be performed by an embodiment of the chart recommendation system 100 of FIG. 1.

The process begins at operation 810, where input data indicating features of a chart is received via a user interface (e.g. user interface 112 of FIG. 1). In some embodiments, the input data may be received via a GUI (e.g. GUI 200 of FIG. 2) and specify various features of the new chart. In some embodiments, the input data may be specified as request parameters of a request or configuration settings in a configuration file. In some embodiments, the input data may be presented as natural language input describing certain features of a new chart.

At operation 820, the chart features are encoded into a feature vector. The encoding may be performed by a component such as chart feature encoder 130 of FIG. 1, and in a manner as discussed in connection with FIG. 5. In some embodiments, a chart feature in the input data may be normalized to remove unimportant aspects of the feature. For example, certain function input parameters may be removed from a query used by the chart. In some embodiments, the chart features are mapped to an encoded value in the feature space based on a predetermined mapping (e.g. the sorted list 540 of FIG. 5). In some embodiments, if the input feature value is missing or cannot be mapped to a value in the features space, a null value will be used to represent that feature in the feature vector. The null value will cause that feature to be ignored by the model during the chart search process.

At operation 830, the feature vector is provided as input to a machine learned model (e.g. machine learned model 140 of FIG. 1). The machine learned model encodes a chart search structure that organizes previous charts into sets of similar charts according to a similarity metric computed based on their feature vectors. In some embodiments, the similarity metric may be the Euclidean distance between to feature vectors. In some embodiments, the machine learned model may be a self-organizing map (e.g. self-organizing map 300 of FIG. 3A) that was previously trained to group similar charts in a training dataset. The previous charts organized by the model may contain charts from the original training dataset. In some embodiments, the previous charts may be stored in a separate chart repository (e.g. chart library 150 of FIG. 1).

At operation 840, a set of similar charts from the previous charts is determined using the model. The set of similar charts are determined to be those that are the most similar to the new chart according to the similarity metric. The set of similar charts may be one of the chart groups 147 of FIG. 1 or chart group 320 of FIG. 3A. In some embodiments, the set is found by determining a best matching unit (BMU) in a self-organizing map whose weight vector is the closest to the feature vector of the new chart. In some embodiments, the machine learned model will output the identifier of the BMU, and that unit identifier is used to retrieve the features of the chart in the chart library or some other data structure (e.g. the hash table 330 of FIG. 3A). In some embodiments, the search process may visit neighboring units of the BMU in successively large neighborhoods until a sufficient number of similar charts are found, as discussed in connection with FIG. 3B.

At operation 850, the set of similar charts found by the chart search is provided as chart recommendations via the user interface. In some embodiments, the chart recommendations may be displayed on a GUI (e.g. GUI 200 of FIG. 2), and may include various metadata such as the chart's name, a short description of the chart, a popularity score of the chart, and a thumbnail image of the chart. In some embodiments, the GUI may provide one or more controls to allow the user to examine the recommended chart in more detail.

At operation 860, the system receives user selection of one of the recommended charts. The user selection may indicate to recreate the recommended chart as the new chart. The user selection may be received via a user control component on the GUI, such as the chart recreation links implemented by the GUI 200 of FIG. 2.

At operation 870, the new chart is created based on the features of the recommended chart that was selected, instead of the features originally indicated by the input data. In some embodiments, the recreation of the recommended chart may be performed by a component such as the chart recreator 180 of FIG. 1. In some embodiments, the recreation process may involve copying features of the previous chart as the features of the new chart being built. In some embodiments, the recreation may simply discard the new chart and recreate the previous chart in its place. In some embodiments, the recreated chart may be displayed to the user via the GUI.

Figure 9:
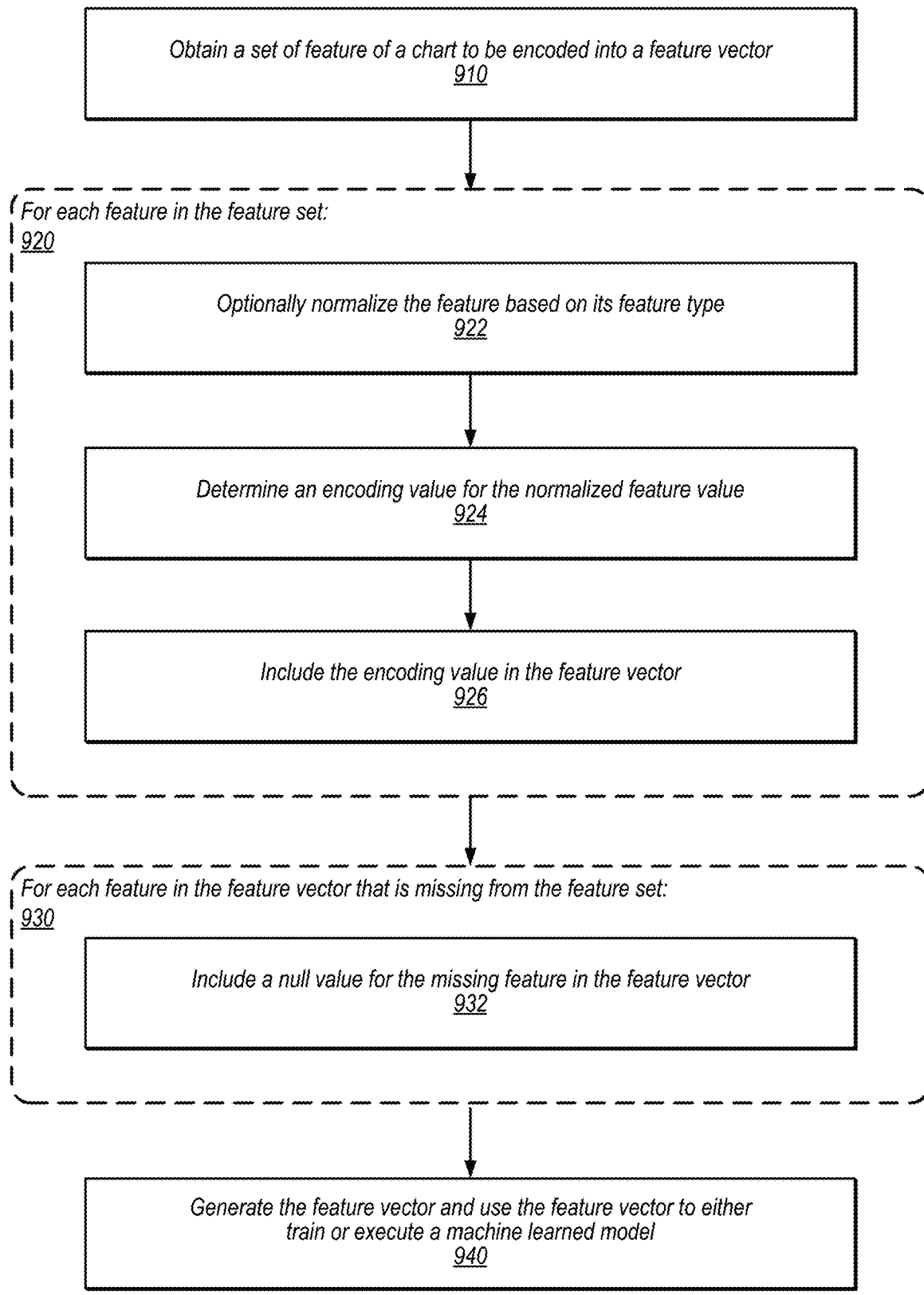
FIG. 9 is a flowchart illustrating a process of encoding features of a chart into a feature vector for use with a chart recommendation model, according to some embodiments.

FIG. 9 is a flowchart illustrating a process of encoding features of a chart into a feature vector for use with a chart recommendation model, according to some embodiments. The depicted process may be performed by the chart feature encode 130 of FIG. 1.

At operation 910, a set of features of a chart is obtained. The features are to be encoded into a feature vector for use a machine learned model such as model 140 of FIG. 1. The chart features may be features 122 of a new chart being constructed by a user, and may be received via a user interface of a chart recommendation system (e.g. user interface 112 of FIG. 1).

As shown, operations 922, 924, and 926 are performed 920 for individual features in the obtained feature set. At operation 922, the feature is normalized based on its feature type. The normalization step is optional, and may not be performed for certain feature types. In some embodiments, the normalization step may be used to remove portions of a feature value that are unimportant for chart comparison purposes. For example, a query used to retrieve data for a chart may be normalized to remove function parameters that are specific to that chart. In some embodiments, certain portions of names or identifiers, such as vendor-specific prefixes, may also be removed.

At operation 924, an encoding value is determined for the normalized value of the feature. In some embodiments, the encoding value is determined based on a mapping structure that was created at the time that the machine learned model is designed. For example, the mapping structure may be the sorted list 540 discussed in connection with FIG. 5, where each distinct feature value seen during training is mapped to a position in the sorted list. In some embodiments, the sorted list may be created by sorting all feature values lexicographically. For some feature values that are numeric, the numeric value itself may be used as the encoding value. In some embodiments, the encoding value may be semantic embeddings of words or phrases, where semantically related or similar words or phrases are mapped to similar embeddings. At operation 926, the encoding value for the feature is included to the feature vector for the chart.

As shown, operation 932 is performed 930 for each feature of the feature vector that is missing or unspecified in the set of chart features. At operation 932, a null value is included in the feature vector for each missing feature. In some embodiments, different features may use different null values. A null value for a feature will cause machine learned model to ignore that feature during the determination of the similarity metric. Accordingly, the model is capable of making chart recommendations even when the user does not specify a complete set of features for a new chart.

At operation 940, the feature vector is generated and used to either train or execute the machine learned model. In some embodiments, the feature vector is encoded as a fixed length array of bytes, and each feature encoded by the vector will occupy some range of bytes in the byte array. The format of the feature vector may be determined when the machine learned model was initially designed. Feature vectors are formatted the same way whether they are used to train the model or perform a chart search using the model.

Figure 10:
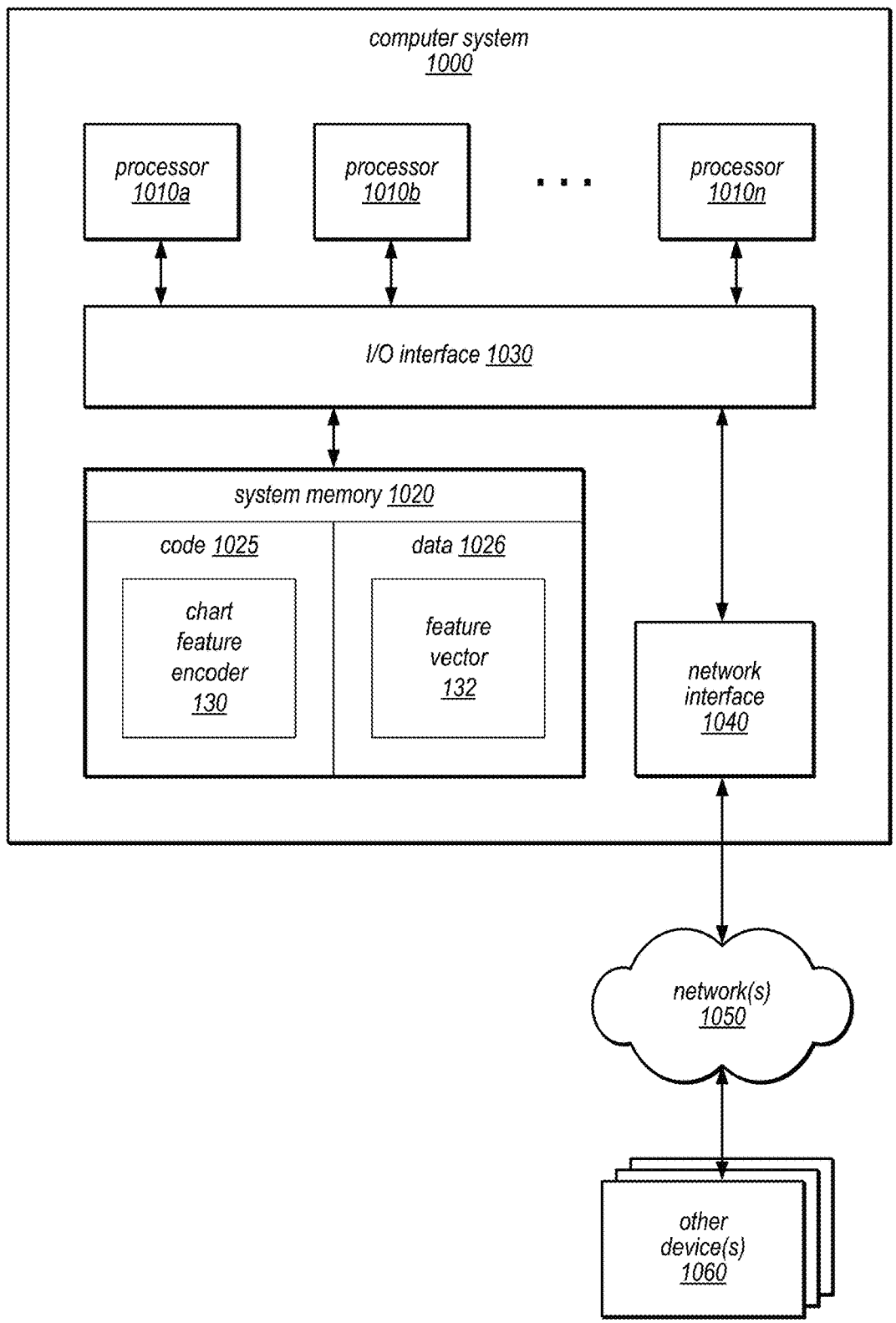
FIG. 10 is a block diagram illustrating an example computer system that can be used to implement one or more portions of a chart recommendation system that uses a ML model to recommend previous charts similar to a new chart being constructed, according to some embodiments.

FIG. 10 is a block diagram illustrating an example computer system that can be used to implement one or more portions of a chart recommendation system that uses a ML model to recommend previous charts similar to a new chart being constructed, according to some embodiments. For example, the computer system 1000 may be a server that implements one or more components of the chart recommendation system 100 of FIG. 1.

Computer system 1000 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 1000 includes one or more processors 1010, which may include multiple cores coupled to a system memory 1020 via an input/output (I/O) interface 1030. Computer system 1000 further includes a network interface 1040 coupled to I/O interface 1030. In some embodiments, computer system 1000 may be a uniprocessor system including one processor 1010, or a multiprocessor system including several processors 1010a-n, as shown. The processors 1010 may be any suitable processors capable of executing instructions. For example, in various embodiments, processors 1010 may implement one of a number of instruction set architectures (ISAs), such as the x86, PowerPC, SPARC, or MIPS ISA.

As shown, the computer system 1000 may also include one or more network communication devices (e.g., network interface 1040) for communicating with other systems and/or components over a communications network. For example, an instance of an application executing on computer system 1000 may use network interface 1040 to communicate with another server application executing on another computer system, as described herein.

As shown, computer system 1000 may use its network interface 1040 to communicate with one or more other devices 1060, such as persistent storage devices and/or one or more I/O devices. In some embodiments, some of these other devices may be implemented locally on the computer system 1000, accessible via the I/O interface 1030. In various embodiments, persistent storage devices may include disk drives, tape drives, solid state memory, other mass storage devices, or any other persistent storage device. The computer system 1000 may store instructions and/or data in persistent storage devices, and retrieve the stored instruction and/or data as needed.

As shown, the computer system 1000 may include one or more system memories 1020 that store instructions and data accessible by processor(s) 1010. In various embodiments, system memories 1020 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 1020 may be used to store code 1025 or executable instructions to implement the methods and techniques described herein. For example, the executable instructions may include instructions to implement the chart feature encoder component 130, as discussed. The system memory 1020 may also be used to store data 1026 needed or produced by the executable instructions. For example, the in-memory data 1026 may include portions of the feature vector 132, as discussed.

In some embodiments, some of the code 1025 or executable instructions may be persistently stored on the computer system 1000 and may have been loaded from external storage media. The persistent storage of the computer system 1000 and the external media are examples of non-transitory computer-readable storage media, which may be used to store program instructions to be executed by the computer system 1000. A non-transitory computer-readable storage medium may provide the capability to store information in a form readable by a machine (e.g., computer system 1000). Non-transitory computer-readable media may include storage media such as magnetic or optical media, disk or DVD/CD-ROM devices, archival tapes, network-attached storage systems, or other computer systems.

In some embodiments, the I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

In some embodiments, the network interface 1040 may allow data to be exchanged between computer system 1000 and other devices attached to a network. The network interface 1040 may also allow communication between computer system 1000 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems 1000. Multiple input/output devices may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1050. Network interface 1040 may commonly support one or more wireless networking protocols (e.g., Wi-Fi/IEEE 802.11, or another wireless networking standard). In some embodiments, the network interface 1040 may support communication via telecommunications/telephony networks such as analog voice networks or digital fiber communications networks, via storage area networks such as Fibre Channel SANs, or via any other suitable type of network and/or protocol.

Although the embodiments above have been described in considerable detail, numerous variations and modifications may become apparent to those skilled in the art once the disclosed inventive concepts are fully appreciated. It is intended that the following claims be interpreted to embrace all such variations and modifications, and the above description to be regarded in an illustrative rather than a restrictive sense.

What is claimed is:

1. A system, comprising:
   one or more hardware processors with associated memory that implement a chart recommendation system, configured to:
      receive input data indicating features of a chart to be created;
      encode the features into a feature vector;
      provide the feature vector as input to a machine learned model, wherein the machine learned model encodes a chart search structure that organizes a plurality of previous charts into sets of one or more similar charts according to a similarity metric computed based on respective features vectors of the previous charts;
      determine, using the machine learned model, one or more similar charts from the plurality of previous charts that are most similar to the chart according to the similarity metric;
      retrieve, from a chart library, respective features of the one or more similar charts;
      output the one or more similar charts as one or more recommended charts, including the respective features of the one or more similar charts; and
      create a new chart based on at least one of the one or more recommended charts, and after the creation:
         update the machine learned model using features of the new chart; and
         save the features of the new chart in the chart library to be used in future recommendations.

2. The system of claim 1, wherein the chart recommendation system is configured to:
   implement a graphical user interface (GUI) that enables a user to create the new chart, wherein the GUI is configured to receive the input data and output the respective features of the one or more recommended charts;
   receive, via the GUI, user selection of one of the one or more recommended charts;
   create the new chart based on features of the recommended chart instead of the features indicated in the input data; and
   display the new chart via the GUI.

3. The system of claim 1, wherein:
   the chart search structure is a two-dimensional grid of neurons in a neural network that is mapped to respective sets of the previous charts; and
   the chart library is a hash table that is keyed based on the neurons.

4. The system of claim 1, wherein:
   the features of the chart include a query used to retrieve the data for the chart, where in the query is specified in a query language; and
   to encode the features into the feature vector, the chart recommendation system is configured to:
      remove one or more input parameters of one or more functions embedded in the query to obtain a normalized query;
      determine an encoding value mapped to the normalized query; and
      include the encoding value in the feature vector.

5. The system of claim 1, wherein:
   the machine learned model is a self-organizing map (SOM); and
   to determine the one or more similar charts, the chart recommendation system is configured to determine a best matching unit (BMU) in the SOM based on the feature vector; and
   to retrieve the respective features of the one or more similar charts, the chart recommendation system is configured to retrieve features of one or more of the previous charts that are mapped to the BMU.

6. The system of claim 5, wherein the chart recommendation system is configured to, for another chart with different features:
   determine another BMU in the SOM for the other chart;
   determine that an insufficient number of charts are mapped to the other BMU;
   perform an expanded search for similar charts, wherein the expanded search includes to:
      check for previous charts that are mapped to neighbor units in a neighborhood of the BMU;
      stop the expanded search if a number of charts mapped to the neighbor units satisfies a sufficiency criterion; and
      continue the expanded search on a larger neighborhood of the BMU if the number of charts mapped to the neighbor units does not satisfy the sufficiency criterion.

7. The system of claim 1, wherein to encode the features into the feature vector, the chart recommendation system is configured to encode one or more of:
   a name of the chart;
   a name of a data source that stores data used in the chart;
   a query used to retrieve the data from the data source;
   a time length specified for the chart; and
   a chart type of the chart.

8. The system of claim 7, wherein to encode the features into the feature vector, the chart recommendation system is configured to encode one or more of:
   a name of a layout group specified for the chart, wherein charts in the layout group are displayed together;
   one or more names of one or more other charts in the layout group;
   a position of the chart in the layout group; and
   a width and height of the chart in the layout group.

9. The system of claim 8, wherein the chart recommendation system is configured to output a recommendation indicating a size of the chart or a position of the chart in the layout group.

10. A method comprising:
performing, by one or more hardware processors with associated memory that implement a chart recommendation system:
receiving input data indicating features of a chart to be created;
encoding the features into a feature vector;
providing the feature vector as input to a machine learned model, wherein the machine learned model encodes a chart search structure that organizes a plurality of previous charts into sets of one or more similar charts according to a similarity metric computed based on respective features vectors of the previous charts;
determining, using the machine learned model, one or more similar charts from the plurality of previous charts that are most similar to the chart according to the similarity metric;
retrieving, from a chart library, respective features of the one or more similar charts;
outputting the one or more similar charts as one or more recommended charts, including the respective features of the one or more similar charts; and
creating a new chart based on at least one of the one or more recommended charts, and after the creation:
updating the machine learned model using features of the new chart; and
saving the features of the new chart in the chart library to be used in future recommendations.

11. The method of claim 10, further comprising performing, by the chart recommendation system:
receiving, via a graphical user interface (GUI), user selection of one of the one or more recommended charts;
creating the new chart based on features of the recommended chart instead of the features indicated in the input data; and
causing the new chart to be displayed via the GUI.

12. The method of claim 10, wherein the encoding of the features into the feature vector comprises encoding one or more of:
a name of the chart;
a name of a data source that stores data used in the chart;
a query used to retrieve the data from the data source;
a time length specified for the chart; and
a chart type of the chart.

13. The method of claim 10, wherein the encoding of the features into the feature vector comprises:
determining that the input data is missing a feature that is encoded by the feature vector; and
encoding a null value in the feature vector for the missing feature, wherein the null value causes the missing feature to be ignored when determining the one or more similar charts.

14. The method of claim 10, further comprising performing, by the chart recommendation system:
periodically training the machine learned model using new charts saved in the chart library.

15. The method of claim 10, comprising performing, by the chart recommendation system:
determining that the new chart is created from a previous chart recommended by the chart recommendation system;
updating a popularity metric for the previous chart recommended; and
updating the machine learned model based on the updated popularity metric.

16. The method of claim 10, further comprising:
receiving features of an input chart to train the machine learned model;
determining, from the features of the input chart, a user attribute of a user who created the input chart; and
training the machine learned model based on the user attribute.

17. The method of claim 10, further comprising performing, by the chart recommendation system:
copying the machine learned model to create a custom model for a particular category of charts;
generating recommendations for new charts in the particular category using the custom model; and
updating the custom model using features of the new charts and without modifying the machine learned model.

18. One or more non-transitory computer-accessible storage media storing program instructions that when executed on or across one or more processors implement at least a portion of a chart recommendation system and cause the chart recommendation system to:
receive input data indicating features of a chart to be created;
encode the features into a feature vector;
provide the feature vector as input to a machine learned model, wherein the machine learned model encodes a chart search structure that organizes a plurality of previous charts into sets of one or more similar charts according to a similarity metric computed based on respective features vectors of the previous charts;
determine, using the machine learned model, one or more similar charts from the plurality of previous charts that are most similar to the chart according to the similarity metric;
retrieve, from a chart library, respective features of the one or more similar charts;
output the one or more similar charts as one or more recommended charts, including the respective features of the one or more similar charts; and
create a new chart based on at least one of the one or more recommended charts, and after the creation:
update the machine learned model using features of the new chart; and
save the features of the new chart in the chart library to be used in future recommendations.

19. The method of claim 10, wherein:
the machine learned model is a self-organizing map (SOM); and
the determining of the one or more similar charts comprises determining a best matching unit (BMU) in the SOM based on the feature vector; and
the retrieving of respective features of the one or more similar charts comprises retrieving features of one or more of the previous charts that are mapped to the BMU.

20. The method of claim 19, further comprising performing, by the chart recommendation system:
receiving another chart with different features;
determining that an insufficient number of charts are mapped to the other BMU;
performing an expanded search for similar charts, including:
checking for previous charts that are mapped to neighbor units in a neighborhood of the BMU;
stopping the expanded search if a number of charts mapped to the neighbor units satisfies a sufficiency criterion; and continuing the expanded search on a larger neighborhood of the BMU if the number of charts mapped to the neighbor units does not satisfy the sufficiency criterion.

\* \* \* \* \*